Figure 1:
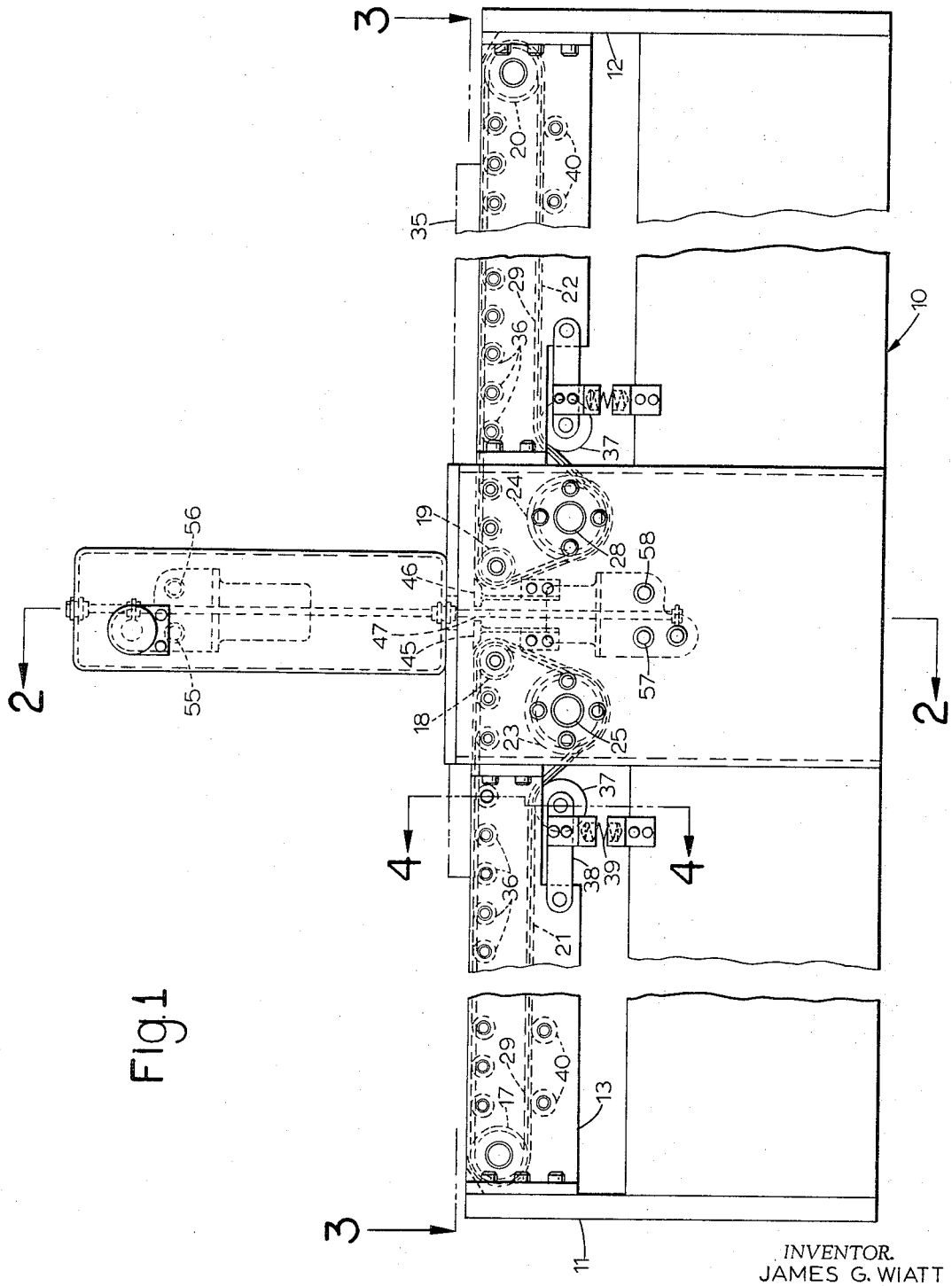

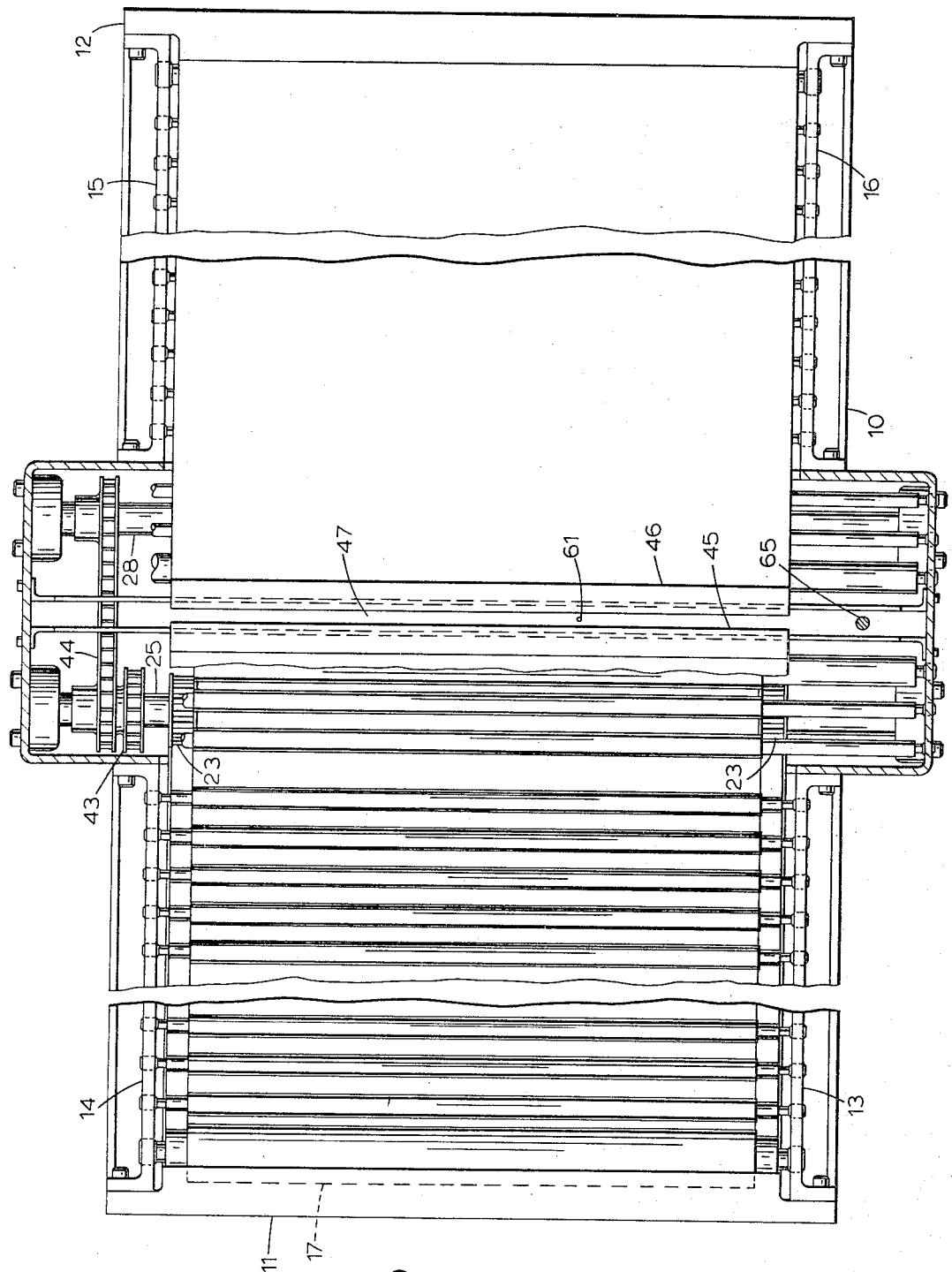

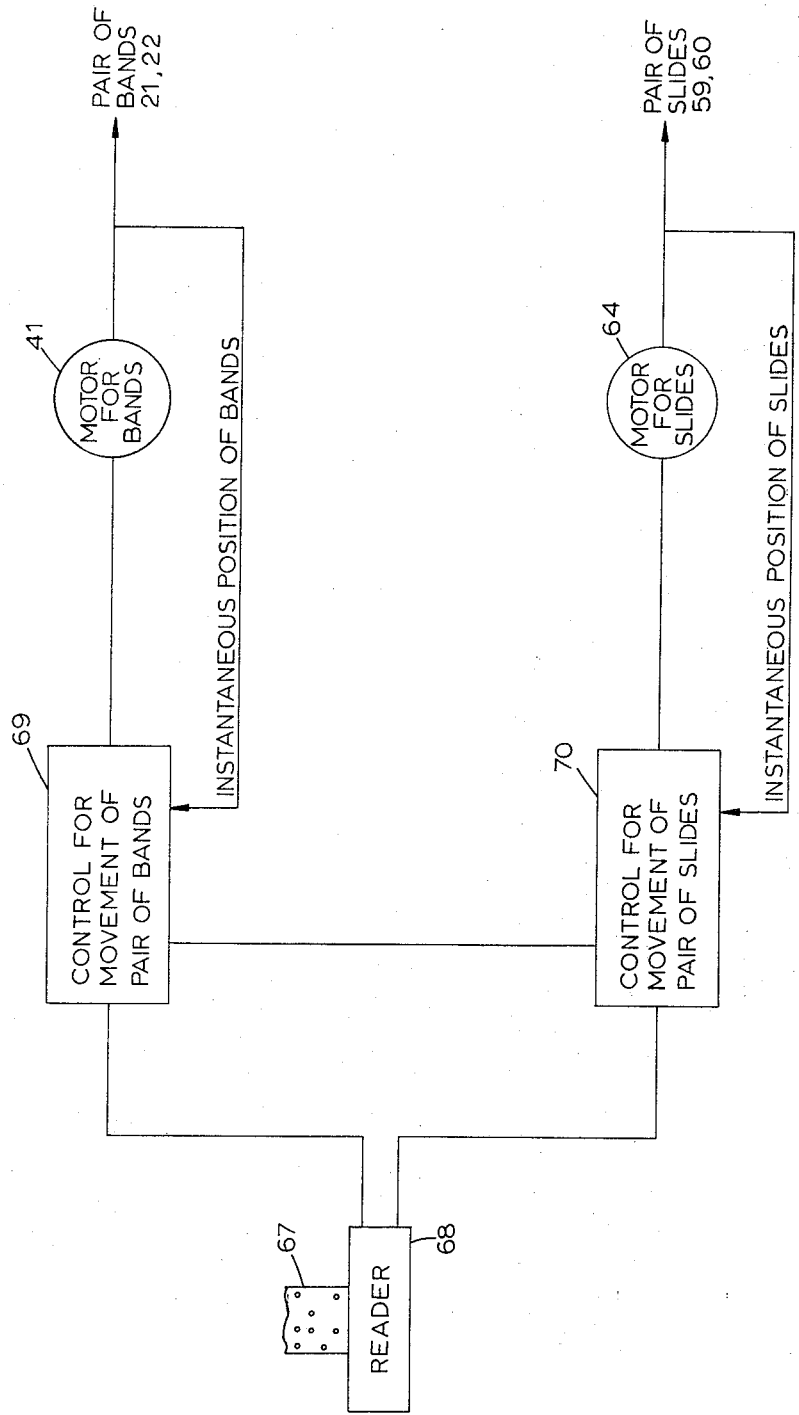

United States Patent Office 3,347,121
Patented Oct. 17, 1967

3,347,121
MACHINE FOR CUTTING MATERIAL
James G. Wiatt, Cincinnati, Ohio, assignor to The Cincinnati Milling Machine Co., Cincinnati, Ohio, a corporation of Ohio
Filed May 24, 1965, Ser. No. 458,271
8 Claims. (Cl. 83—71)

The present invention relates to a machine for cutting material particularly suitable for cutting diverse irregular patterns in cloth.

In a machine suitable for cutting diverse irregular patterns in cloth, complete universal movement in a plane between the cloth and a cutting blade must be effected. In the usual cloth cutting machine, such as shown in U.S. Patent 1,172,058 and 1,172,059, the cloth is supported in a cutting plane by a table. In machines of this type, the cutting stroke of the blade must be restricted to avoid interference with the table.

In the machine of the present invention a gap, or opening, in the table is continuously present at the point the blade intersects the cutting plane regardless of the region of the cloth being cut. The table in the present machine is defined by two flexible endless bands, one on each side of the cutting blade which is mounted for cross-movement between the two bands. The bands, which are supported by stationary support rollers, revolve in unision about two or more guide rollers and are reversible to selectively move the cloth longitudinally back and forth with respect to the linear path of the cutting blade. The cutting blade is reversible to move across the cloth, in one direction or the other, in coordination with the back and forth longitudinal movement of the cloth. Thus, universal relative movement in a plane between the cloth and the cutting blade is effected.

It is one object of the present invention to provide a machine for cutting material in which the action of the cutting blade is not restricted by the table supporting the material. It is another object of the present invention to provide a cloth cutting machine having a straight slot extending across the table for linear cross-movement of the cutting blade and having means to feed the cloth back and forth with respect to the slot. It is another object of the present invention to provide a cloth cutting machine in which the cloth is supported by two flexible spaced apart bands which, in turn, are supported by stationary support rollers. Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 2:
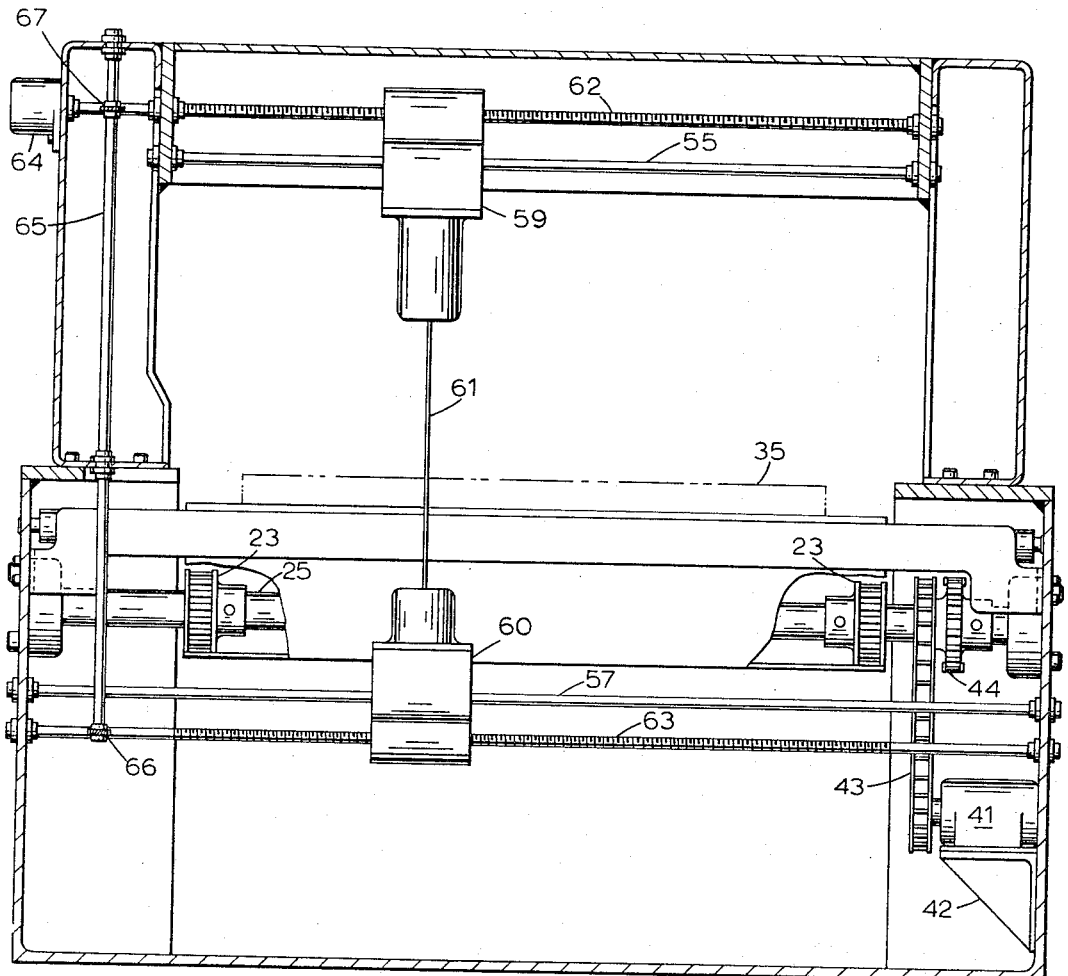
Figure 4:
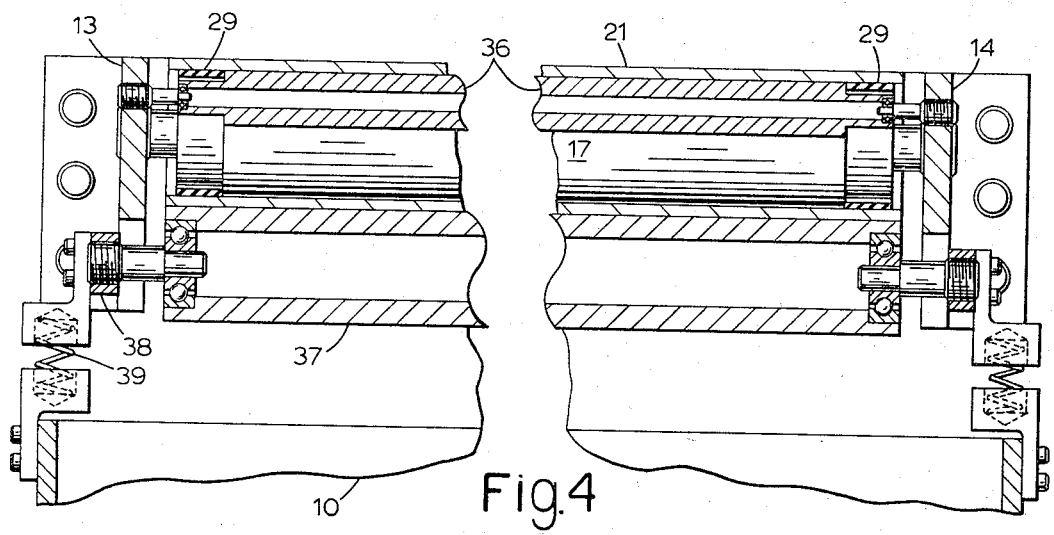

In the drawings:

FIG. 1 is a side elevation of the machine of the present invention;

FIGS. 2, 3, and 4 are views taken on the lines 2—2, 3—3, and 4—4, respectively, of FIG. 1;

FIG. 5 is a schematic diagram of the control system of the machine of the present invention, and FIG. 6 is a schematic diagram showing the machine of the present invention cutting an irregular pattern in cloth.

There is shown in the drawings a machine for cutting material such as cloth piled in layers. The machine has a frame 10 with upstanding end members 11 and 12. The frame has a pair of upper side plates 13, 14 (see FIG. 3) to the left (as viewed in FIG. 3) of the center of the frame, and a similar pair of upper side plates 15, 16 to the right (as viewed in FIG. 3) of the center of the frame. A pair of horizontally spaced guide rollers 17, 18 are journaled in, and extend between, side plates 13 and 14. A similar pair of horizontally spaced guide rollers 19, 20 are journaled in, and extend between, side plates 15, 16. A flexible endless band 21 is received over guide rollers 17, 18, and a similar flexible endless band 22 is received over guide rollers 19, 20. Each band has a flexible endless belt 29 with teeth secured along the inner edges of the bands as shown in FIG. 4. The teeth on the belts attached to band 21 are engaged with the teeth on drive pulleys 23 which are mounted on drive shafts 25. The teeth on the belts 29 attached to band 22 are engaged with the teeth on drive pulleys 24 mounted on drive shaft 28.

The upper span of band which, at any instant, extends between the top of the guide rollers of each pair 17–18, 19–20 lies in a flat horizontal plane to define a table top to receive the material 35 to be cut. A plurality of horizonally spaced guide rollers 36 are journaled in and extend between the side plates 13, 14 and 15, 16 for rotation on stationary axes to support the band. An idler roller 37 for each band is mounted on pivotal arms 38 which are biased by springs 39 to maintain the bands taut. Additional support rollers 40 are journaled in and extend between the side plates 13, 14 and 15, 16 for rotation on stationary axes to support the span of band which, at any instant, extends between roller 38 and the bottom of the outer guide roller (17, 20).

A reversible motor 41 (see FIG. 2) is mounted on a bracket 42 in the frame. The motor rotates drive shaft 25 in one direction or the other through a chain 43. A drive band, or chain, 44 (FIG. 3) connects drive shaft 25 to drive shaft 28 so that the two drive shafts are rotated in unison in either direction by motor 41. Two shelves, 45 and 46, are mounted on the frame between the two inner guide rollers 18, 19. The two shelves are slightly spaced apart to define a gap 47 therebetween extending in a straight line across the frame. The upper portions of the bands and the two shelves support the material to be cut. At any instant, the upper portions of the bands will both be stationary, or will both move in one direction, or will both move in the opposite direction. Thus, the material on the table top defined by bands 21, 22 and the shelves 45, 46 will be stationary, or will move to the left (as viewed in FIG. 1) without wrinkling or bunching, or will move to the right (as viewed in FIG. 1) without wrinkling or bunching.

As shown best in FIG. 1 and FIG. 2, a pair of shafts 55, 56 extend across the frame above the table top and a pair of shafts 57, 58 extend across the frame below the table top. A slide, or carriage, 59 is mounted on the upper shafts 55, 56, and slide, or carriage, 60 is mounted on the lower shafts 57, 58. A cutting blade 61, which extends between the two slides 59, 60, passes through slot 47 and is reciprocated by mechanism (not shown) in the slides. The blade is circular in cross-section and has small barbs (not shown) around the periphery to cut in any direction.

A screw 62 is threadedly received in the upper slide 59, and a screw 63 is threadedly received in the lower slide 60. The screw 62 is rotated by a reversible motor 64 connected thereto. A vertical shaft 65 is connected to lower screw 63 by helical gearing 66 and is connected to upper screw 62 by helical gearing 67 so that motor 64 drives screws 62 and 63 in unison in one direction or the other. Thus the slides 59 and 60 move in unison, one above the other, in one direction or the other across the carriage.

As shown in FIG. 5, prerecorded data input in the form of a tape 67 is fed into a reader 68 to transmit control signals to control apparatus 69 for control of motor 41 and is fed to control apparatus 70 for control of motor 64. The motors are controlled to move the bands and slides as directed by the tape and the instantaneous positions of the bands and slides are fed back to the control apparatus. Thus the motion of the bands and slides, and hence the motion of the material 35 and blade 61, are coordinated in accordance with the data on the tape.

Figure 6A:
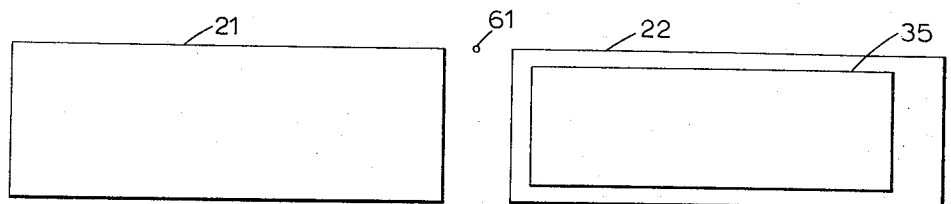
Figure 6B:
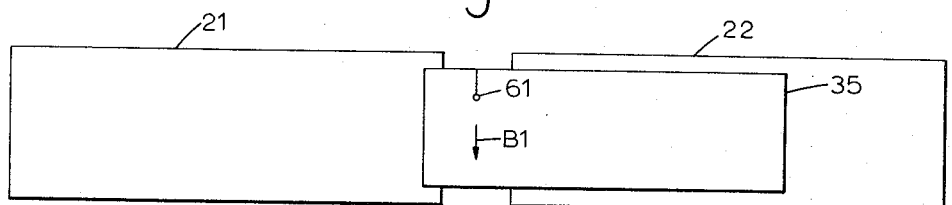
Figure 6C:
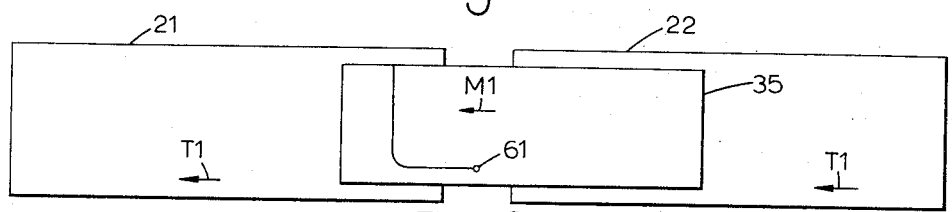
Figure 6D:
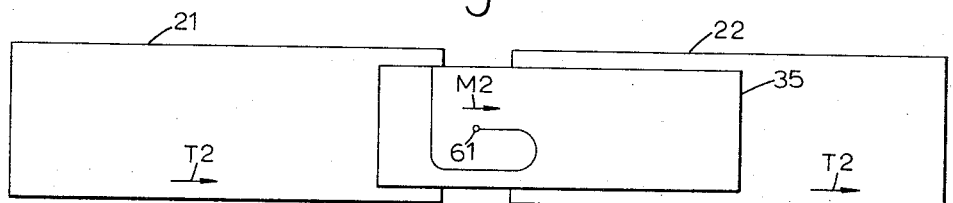
Figure 6E:
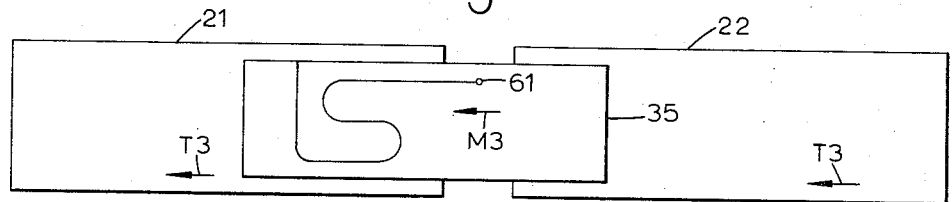
Figure 6F:
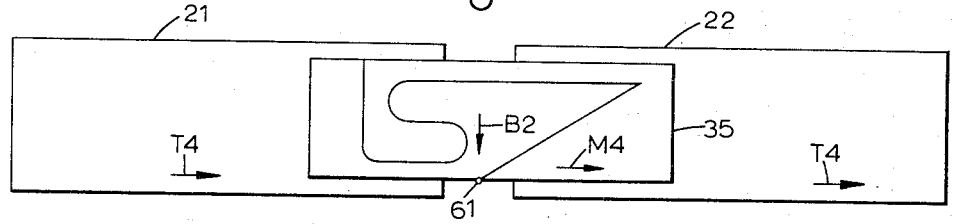

As shown in FIGS. 6a to 6f, inclusive, any desired pattern can be cut in material such as cloth with the cutting machine of the present invention. The cloth 35 is stacked on one (22) of the endless bands, as shown in FIG. 6a, and then is moved to the left. If the motor 41 is stopped, to stop the longitudinal movement of the cloth, when the blade enters the material (as indicated by arrow B1 in FIG. 6b), the blade will make a straight cut across the material as shown in FIG. 6b. If the material is moving, as indicated by arrows M1, M2, or M3 in FIGS. 6c, 6d, or 6e, and the motor 64 is stopped to stop the cross movement of the blade as shown in FIGS. 6c, 6d, or 6e, the reciprocating blade will make a straight cut parallel to the sides of the cloth. Simultaneous operation of motors 41, 64 a constant speeds (to produce longitudinal movement of the bands and material as shown by arrow M4 and to produce cross-movement of the blade as shown by arrow B2) will produce diagonal straight cuts as shown in FIG. 6f. Simultaneous operation of motors 41, 64 at varying preselected speeds will produce any desired arcuate cut such as those shown in FIG. 6e connecting the straight cuts.

What is claimed is:
1. A material cutting machine comprising:
   (a) a cutting blade,
   (b) an endless band on each side of the cutting blade to receive material,
   (c) means to move said bands in either direction to move material longitudinally on the bands relative to the blade,
   (d) means to coordinate movement of said bands, and
   (e) means to move the cutting blade across the material between the bands, said blade moving in cutting engagement with the material and in coordination with the longitudinal movement of the material.
2. A material cutting machine comprising:
   (a) a cutting blade,
   (b) a pair of horizontally spaced rollers on each side of the blade,
   (c) an endless band received on each pair of rollers,
   (d) means to drive one roller in either direction,
   (e) a drive band connecting one roller on one side of the cutting blade with a roller on the other side of the cutting blade to effect movement of the bands in unison, and
   (f) means to move the cutting blade between the bands in cutting engagement with the material and in coordination with movement of the bands.
3. A cloth cutting machine comprising:
   (a) a cutting blade,
   (b) a pair of guide rollers on each side of the cutting blade,
   (c) an endless band received on each pair of guide rollers to receive the cloth,
   (d) means to revolve said bands on said guide rollers in unison to move the cloth relative to the cutting blade,
   (e) means to move said cutting blade between the pairs of rollers in cutting engagement with the material and in coordination with movement of the cloth to cut the material in a selected direction, and
   (f) a plurality of support rollers rotatable in stationary spaced axes and positioned between the guide rollers of each pair to support the bands.
4. A cloth cutting machine comprising:
   (a) an elongated frame,
   (b) a carriage mounted for cross-movement on the frame,
   (c) a cutting blade mounted on the carriage,
   (d) a pair of longitudinally spaced guide rollers on each side of the carriage,
   (e) an endless band received on each pair of guide rollers to receive the cloth, said cloth lying on both bands in a plane out of the path of the carriage but in the path of the cutting blade,
   (f) means to revolve said bands on said guide rollers in either direction in unison to move the cloth longitudinally relative to the cutting blade,
   (g) means to move the carriage across the frame for movement of the blade between the bands in coordination with longitudinal movement of the cloth to cut the cloth in a selected direction, and
   (h) a plurality of support rollers mounted on the frame for rotation in horizontally spaced stationary axes positioned between the guide rollers of each pair to support the bands.
5. A cloth cutting machine comprising:
   (a) an elongated frame,
   (b) a carriage mounted for cross-movement on the frame,
   (c) a cutting blade mounted on the carriage,
   (d) a pair of longitudinally spaced rollers on each side of the carriage,
   (e) an endless band received on each pair of rollers to receive the cloth, said cloth lying on both bands in a plane out of the path of the carriage but in the path of the cutting blade,
   (f) a first motor to revolve both of said bands in either direction in unison to move the cloth longitudinally relative to the cutting blade,
   (g) a second motor operated in coordination with the first motor to move said carriage across the frame for movement of the blades between the bands in coordination with longitudinal movement of the cloth to cut the cloth in a selected direction, and
   (h) a plurality of support rollers mounted on the frame for rotation in horizontally spaced stationary axes positioned between the guide rollers of each pair to support the band.
6. A cloth cutting machine comprising:
   (a) a cutting blade,
   (b) an endless band on each side of the cutting blade to receive the cloth, and
   (c) a control responsive to predetermined data input to move the bands in unison in either direction and to move the cutting blade between the band in either direction to cut the cloth in a desired pattern.
7. A cloth cutting machine comprising:
   (a) a cutting blade,
   (b) an endless band on each side of the cutting blade to receive the cloth,
   (c) a plurality of stationary support rollers in supporting engagement with each band, and
   (d) a control responsive to predetermined data input to move the bands in unison in either direction and to move the cutting blade between the bands in either direction to cut the cloth in a predetermined pattern.
8. A cloth cutting machine comprising:
   (a) an elongated frame,
   (b) a carriage mounted for cross-movement on the frame,
   (c) a cutting blade mounted on the carriage,
   (d) an endless band mounted on the frame on each side of the carriage, said bands supporting the cloth in a cutting plane out of the path of the carriage but in the path of the cutting blade,
   (e) a plurality of support rollers mounted on the frame for rotation in horizontally spaced stationary axes to support each band,
   (f) means including a motor and a control to revolve said bands in either direction in unison to move the cloth longitudinally relative to the cutting blade,
   (g) means including a motor and a control to move the carriage across the frame to move the blade across the cloth between the bands, and (h) means including recorded data input to said controls to coordinate said motors for cutting the cloth in predetermined patterns.

References Cited

UNITED STATES PATENTS

| | | | |
|---|---|---|---|
| Re. 9,060 | 1/1880 | Damant | 83—271 |
| 824,948 | 7/1906 | Pollock | 83—428 |
| 828,546 | 8/1906 | Hart | 83—155 |
| 1,172,058 | 2/1916 | Scheyer | 83—71 |
| 1,748,243 | 2/1930 | Peterson | 83—424 |
| 2,788,069 | 4/1957 | Noojin et al. | 83—531 |
| 3,170,350 | 2/1965 | Hawkins | 83—271 |
| 3,199,390 | 8/1965 | Arnould et al. | 83—284 |
| 3,304,820 | 2/1967 | Muller et al. | 83—428 X |

FOREIGN PATENTS 717,446  10/1931  France.

ANDREW R. JUHASZ, *Primary Examiner.*

JAMES M. MEISTER, *Examiner.*

L. B. TAYLOR, *Assistant Examiner.*